Figure 1:
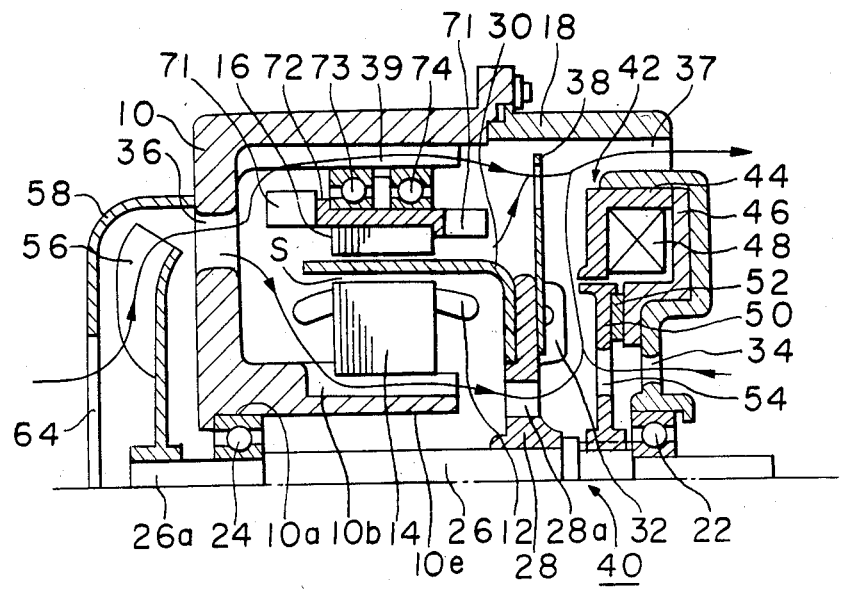

United States Patent [19]

Kumatani

[11] Patent Number: 4,562,367
[45] Date of Patent: Dec. 31, 1985

[54] LOW INERTIA, SPEED VARIABLE INDUCTION MOTOR

[75] Inventor: Hiroshi Kumatani, Nagoya, Japan

[73] Assignee: Mitsubishi Denki Kabushiki Kaisha, Tokyo, Japan

[21] Appl. No.: 508,043

[22] Filed: Jun. 27, 1983

[30] Foreign Application Priority Data

Jun. 30, 1982 [JP] Japan .............................. 57-98959[U]
Jun. 30, 1982 [JP] Japan .............................. 57-98960[U]

[51] Int. Cl.⁴ .............................................. H02K 9/00
[52] U.S. Cl. ........................................ 310/62; 310/63; 310/266
[58] Field of Search ............... 310/266, 77, 76, 60-63, 310/114

[56] References Cited

U.S. PATENT DOCUMENTS

| | | | |
|---|---|---|---|
| 2,542,659 | 2/1951 | Gillett | 310/266 |
| 2,626,366 | 1/1953 | Stoner et al. | 310/114 |
| 2,653,256 | 9/1953 | Walley et al. | 310/266 X |
| 2,974,242 | 3/1961 | Apstein | 310/266 |
| 3,648,090 | 3/1972 | Voin | 310/62 X |

FOREIGN PATENT DOCUMENTS 3323297 6/1983 Fed. Rep. of Germany .
274216 6/1970 U.S.S.R. .............................. 310/266

Primary Examiner—Donovan F. Duggan
Attorney, Agent, or Firm—Oblon, Fisher, Spivak, McClelland & Maier

[57] ABSTRACT

A low inertia, speed variable induction motor with a stator, a yoke, and a rotor mounted on an output shaft being accommodated in the interior of a frame, wherein the stator is fixedly provided inside the frame, the yoke is rotatably mounted inside the frame in a manner to oppose the stator with a small gap between them, and a cup-shaped rotor is inserted into the small gap between the yoke and the stator, thereby reducing the size and weight of the driving body including the cup-shaped rotor, and improving its high speed response property.

2 Claims, 2 Drawing Figures

U.S. Patent    Dec. 31, 1985    4,562,367

LOW INERTIA, SPEED VARIABLE INDUCTION MOTOR

This invention relates to a low inertia, speed variable induction motor. More particularly, it is concerned with a low inertia, speed variable induction motor in which the rotational energy is relatively low with respect to torque of the rotor.

In general, a servomotor for numerical control or a speed variable driving motor for industrial sewing machine is required to have a steep rising or trailing performance in its rotational speed.

At present, it has generally been admitted that the electric motor which is the most suitable for such use is a direct current electric motor to be driven by a thyristor-Leonard control power source. The reason for this is that the direct current electric motor is excellent in its controlling capability, and that it has a large starting torque and excellent speed response property, and others. However, such DC electric motor requires a permanent magnet, a commutator, a brush holder, and so forth. Further, it is not able to increase its rotational speed so high from the standpoint of its rectification characteristic, has a limit to reduction in its size and weight, and also requires maintenance against wear of the commutator brush.

In contrast to this, since the induction motor can be used without necessity for maintenance, it can replace the DC electric motor for the above-mentioned use to the full extent, provided that an inexpensive inverter control power source becomes available.

However, in the conventional speed variable induction motor, there remained a point of problem such that its rotational energy was still high with respect to the torque of the driving body, because a yoke which generates rotating magnetic field in cooperation with the stator was mounted on the rotor and the weight of the driving body including the rotor and the yoke was relatively large, i.e., the driving body was constructed with component parts of large size and weight.

On account of this, the conventional induction motor had such disadvantages that it could not be employed for direct use in various machines and appliances such as, for example, sewing machine, etc. which are required to have excellent response properties such as a steep rising and trailing performance, etc. and, when such induction motor must be used anyway, the load of the machine and appliance such as sewing machine had to be driven through a particular device such as an electromagnetic joint device, etc.

The present invention has been made in view of the conventional problem as described in the preceding, and has its object in providing a low inertia, speed variable induction motor with its rotational energy being made relatively low with respect to the torque of the rotor, and having excellent response property such as steep rising and trailing performance, high efficiency, and a simple construction.

According to the present invention, in it's general aspect, there is provided a low inertia, speed variable induction motor, characterized by a stator fixedly provided in a frame; a yoke disposed in opposition to the stator with a small gap between them and rotatably mounted on in the frame; and a cup-shaped rotor fixedly mounted on an output shaft inserted in said gap in a freely rotatable manner.

The foregoing object, other objects, and the specific construction and function of the low inertia, speed variable induction motor according to the present invention will become more apparent and understandable from the following detailed description thereof, when read in conjunction with the accompanying drawing showing preferred embodiments of the invention.

Figure 2:
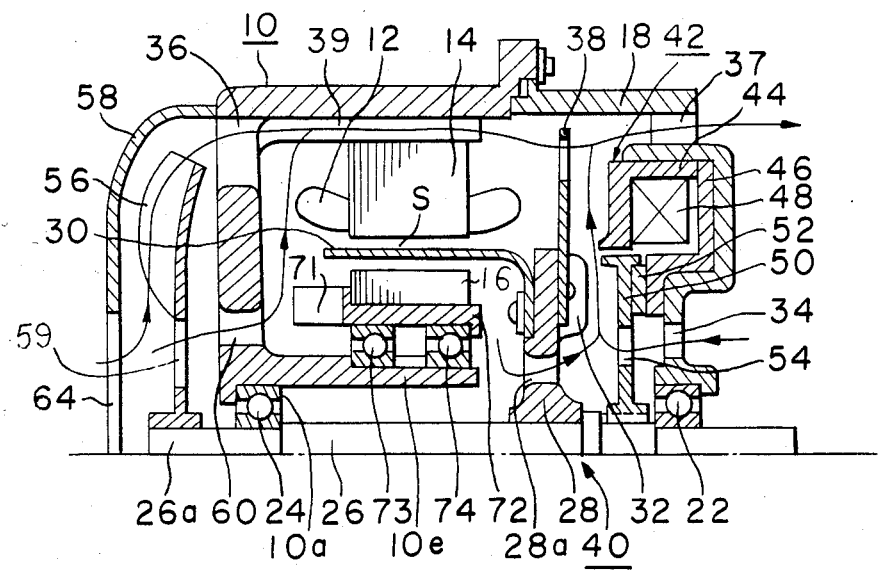

In the drawing:

FIG. 1 is a halved cross-sectional view showing the first preferred embodiment of the induction motor according to the present invention; and FIG. 2 is also a halved cross-sectional view showing the second preferred embodiment of the induction motor according to the present invention.

In the following, the present invention will be described in detail with reference to two preferred embodiments thereof shown in the accompanying drawings.

FIG. 1 shows the first preferred embodiment of the low inertia, speed variable induction motor according to the present invention. In the drawing, a stator 14 having a stator winding 12 as in an ordinary induction motor is fixed on the outer peripheral surface of the center wall 10e of a frame 10 for the electric motor. On the other hand, a yoke 16 made up of a laminated core is fixed on a yoke supporting stand 72 provided with cooling fans 71 in opposition to the stator 14 with a small gap between them. The yoke supporting stand 72 is rotatably mounted on the inner peripheral surface of the outer wall of the frame 10 through bearing means 73, 74. On account of such construction, rotating magnetic field is formed in the gap S by the stator 14 and the yoke 16 due to conduction of electric current through the stator winding 12.

An output shaft 26 is axially supported in a freely rotatable manner on bearings 22, 24 which are respectively fixed in a bracket 18 made of a non-magnetic material and mounted on the frame 10 and in a perforation 10a formed at the center of the wall 10e situated at the center part of the frame 10. The cup-shaped rotor 30 is fixed with screws (not shown in the drawing) on the supporting stand 28 mounted on the output shaft 26, in a manner to be inserted into the above-mentioned gap S. The cup-shaped rotor 30 is made of a circular disc of a non-magnetic and high electrically conductive material such as aluminum, copper, silver-copper alloy, and so forth. With the rotating magnetic field formed by the above-mentioned stator 14 and the yoke 16, an eddy current is generated in the cup-shaped rotor 30, and a driving torque is produced with linkage of the rotating magnetic field and the eddy current. In this case, since the yoke 16 produces its rotational force with the above-mentioned rotating magnetic field, and rotates together with the yoke supporting stand 72, the iron loss can be remarkably reduced in comparison with the case of using the fixed type yoke.

Further, by rotation of the cooling fans 71 provided on the yoke supporting stand 72, cooling air for cooling the interior of the electric motor is sucked in through a suction port 36 formed in the left end surface of the frame 10. This cooling air passes through a portion 39 to be cooled, which is provided on the frame 10, and is discharged outside from a discharge port 37 formed in the bracket 18. Furthermore, a number of cooling fans 32 cooling the interior of the electric motor are provided on the supporting stand 28 in the circumferential direction in their arrangement. Holes 28a are formed in the supporting stand 28 radially inwardly of the cooling fans 32 to serve as passageways for the cooling air. By rotation of the cooling fans 32 on the supporting stand 28, the cooling air from the suction port 34 formed in the bracket 18 is introduced into the motor interior, and then it is discharged from the discharge port 37. The cooling air is also drawn in through the suction port 36 by the rotation of the cooling fans 32. This cooling air passes through a part to be cooled 10*b*, which is provided on the outer periphery of the center wall 10*e* of the frame 10, then goes through the holes 28*a* in the supporting stand 28, and is then discharged outside through the discharge port 37.

A heat discharging fin 38 of a disc-shape is mounted on the supporting stand 28, and heat generated in the cup-shaped rotor 30 is dissipated from the heat-discharging fin 38. The supporting stand 28 is made of a material such as, for example, aluminum which has good heat-conductivity so that heat generated in the cup-shaped rotor 30 may be quickly dissipated, and which also has good electric conductivity so that it may provide a large torque in a low slipping condition as an end ring of the cup-shaped rotor 30. In addition, at a salient part 26*a* of the output shaft 26, as shown in the drawing, there is fixedly provided a cooling fan 56 of a larger size so as to effect more cooling of the interior of the electric motor. The cooling fan 56, upon its rotation, introduces cooling air through a suction port 64 formed in a fan cover 58, causes it to pass through the suction port 36 formed in the frame 10 and the part 39 to be cooled, and discharges it through the discharge port 37 formed in the bracket 18. There is further mounted on the output shaft 26 an electromagnetic brake 42 to control the rotational movement of the driving body 40, which includes the above-mentioned supporting stand 28 and the cup-shaped rotor 30. The electromagnetic brake 42 is of a construction described in the following.

Iron core parts 44, 46 of the electromagnetic brake 42 is supported on the bracket 18 made of a non-magnetic material. Inside the iron core part 44, there is received and held therein a brake winding 48 which is for introducing magnetic flux to these iron core parts 44, 46. On the output shaft 26, a brake disc 50 is mounted so as to be freely movable in the axial direction. The brake disc 50 is constantly biased in the leftward direction away from the iron core part 46 by a spring (not shown). On the surface of the brake disc 50 opposite to the iron core part 46, there is fixedly secured a brake pad 52. With frictional force between the brake pad 52 and the iron core part 46, quick stoppage of the output shaft 26 can be effected. Incidentally, a vent hole 54 is formed in the brake disc 50, which is for leading the cooling air sucked in through the above-mentioned suction port 34 into the inner part of the electric motor.

In the following, explanations will be given as to the operations of the induction motor according to the present invention in its first embodiment as described in the foregoing.

On energization of the stator winding 12, a rotating magnetic field is introduced into the gap S by the cooperative action between the stator 14 and the yoke 16. This rotating magnetic field produces a rotational force in the yoke due to the eddy current. However, since the yoke 16 and the yoke supporting stand 72 are mounted in a freely rotatable manner on the inner periphal surface of the outer wall of the frame 10 through the bearings 73, 74, the yoke 16 rotates together with the yoke supporting stand 72. The above-mentioned rotating magnetic field generates the eddy current in the cup-shaped rotor 30. By linkage of this eddy current with the magnetic flux, a driving torque is generated in the cup-shaped rotor 30, and a mechanical rotational output can be taken out from the output shaft 26 which is the axial core for the cup-shaped rotor 30. At the start of rotation of the motor as mentioned above, since the driving body 40 of the electric motor is constructed as a low inertial driving body, with the structural members of reduced size and weight including the supporting stand 28 mounted on the output shaft 26 and the cup-shaped rotor 30 mounted on the supporting stand 28, the motor has excellent response properties such as steep rising and trailing performance, and others. In other words, the conventional induction motor was of such a construction that the driving body thereof had the rotor and the yoke as an integral part, while the induction motor according to the present invention is of such a construction that the cup-shaped rotor 30 is made independent from the yoke 16 so as to form the driving body with the structural component members of reduced size and weight inclusive of the cup-shaped rotor 30 and the supporting stand 28 to support the same. In addition, since the cup-shaped rotor 30 is extended in the axial direction, the motor can be reduced its size in the diametrical direction, and, at the same time, a large surface area is provided in which the eddy current can be generated. Moreover, since the yoke 16 rotates together with the yoke supporting stand 72, the iron loss can be remarkably reduced in comparison with the fixed type yoke. For all the foregoing reason, an induction motor of high efficiency can be obtained.

An induction motor such as is described in the preceding is highly suitable as the servomotor for numerical control mechanisms which are required to have steep rising and trailing performance, or as a speed variable driving motor for industrial sewing machine. The motor is capable of performing abrupt starts and stops easily and efficiently.

Also, braking of the driving body 40 is done by adjustment of electric current flowing through the stator winding 12 and the brake winding 48. For example, when the load to with the output shaft 26 is to be stopped abruptly, the current flowing through the stator winding 12 is interrupted, and, at the same time, the current is caused to flow through the brake winding 48 of the electromagnetic brake 42, thereby actuating the electromagnetic brake 42. That is to say, by the current flow through the brake winding 48, there is produced the magnetic flux which passes through the iron core parts 44, 46 and the brake disc 50, and the brake disc 50 is attracted to the iron core part 46. As the result, the output shaft 26 quickly stops its rotation by the friction between the brake pad 52 and the iron core part 46.

When the electric current is caused to flow through the brake winding 48 as mentioned above, magnetic flux is produced in the iron core parts 44, 46 and the brake disc 50. However, since the bracket 18 to support the iron core parts 44, 46 is made of a nonmagnetic material, there is no possibility of generation of the leakage magnetic flux extending from the iron core part 46 to the brake disc 50 through the bracket 18 and the bearing 22. Accordingly, there is no possibility of the above-mentioned leakage magnetic flux passing through the bearing 22, which is in the rotating condition. Hence, the bearing 22 is protected from damage due to heat generated therein by the eddy current.

Subsequently, the motor itself is brought to a state of heat generation due to driving of the motor. In this case, cooling air is introduced from outside of the motor through the air suction ports 64, 34 and 36 by rotation of the cooling fans 32 provided on the supporting stand 28, the cooling fan 71 provided on the yoke supporting stand 72, and the cooling fan 56 fixedly provided on the output shaft 26, and the air after cooling the motor is discharged outside through the discharge port 37, whereby the temperature increase in the interior of the electric motor can be effectively prevented.

Further, since the heat discharging fin 38 is fixedly provided on the cup-shaped rotor 30, the heat from the cup-shaped rotor in its heated condition is transmitted to the heat-discharging fin 38 which is cooled by the cooling air, whereby the cup-shaped rotor 30 and the supporting stand 28 supporting the same can be sufficiently cooled.

Although, in the above-described embodiment of the present invention, the yoke portion is of such a construction that the yoke 16 made up of the laminated iron plates is separated from the yoke supporting stand 72, it is of course feasible that both yoke and yoke supporting stand may be integrally constructed from magnetic material having high magnetization characteristic.

Furthermore, in case leakage magnetic flux passes through the bearings 73, 74 which support the yoke supporting stane 72, it may be possible to manufacture the yoke supporting stand 72 from a non-magnetic material with a view to protecting the bearings 73, 74 from damage due to heat generated from the eddy current.

FIG. 2 illustrates the second preferred embodiment of the induction motor according to the present invention. In this embodiment, contrary to the case of the above-mentioned first embodiment, the stator 14 is fixedly provided on the inner surface of the outer peripheral wall of the frame 10, and the yoke made up of laminated iron plates is rotatably fixed by the bearings 73, 74 on the outer peripheral surface of the center wall 10e of the frame 10.

A reference numeral 59 designates a vent hole formed in the center part of the cooling fan 56 opposite to the vent hole 64 formed in the center part of the cover 58 which covers one end surface of the frame 10. A numeral 60 refers to a suction port formed in the frame 10 radially outwardly of its center part and opposite to the vent hole 59. The rest of the constituent parts are of the same construction as in the above-mentioned first embodiment. Hence, they are designated by the same reference numerals and explanations thereof are dispensed with.

In the following, explanations will be given as to the operations of the induction motor according to the present invention in its second embodiment as described in the foregoing.

Upon energization of the stator winding 12, a rotating magnetic field is introduced into the gap S by the cooperative action between the stator 14 and the yoke 16. While this rotating magnetic field also produces a rotational force in the yoke due to the eddy current, since the yoke 16 and the yoke supporting stand 72 are mounted in a freely rotatable manner on the center part of the frame 10 by means of the bearings 73, 74, the yoke 16 rotates together with the yoke supporting stand 72. The above-mentioned rotating magnetic field generates the eddy current in the cup-shaped rotor 30. By linkage of this eddy current with the magnetic flux, driving torque is generated in the cup-shaped rotor 30, and a mechanical rotational output can be taken out of the output shaft 26 which constitutes the axial core for the cup-shaped rotor 30. At the start of rotation of the motor as mentioned above, since the driving body 40 of the electric motor is constructed as a low inertial driving body, with the structural component members of reduced size and weight including the supporting stand 28 mounted on the output shaft 26 and the cup-shaped rotor 30 mounted on the supporting stand 28, the motor has excellent response properties such as steep rising and trailing performance and so forth, as is the case with the afore-described first embodiment.

As has been explained in the foregoing, the driving body of the induction motor according to the present invention is constructed with the structural component members of reduced size and weight, including the cup-shaped rotor provided independently of the yoke, and the cup-shaped rotor can be extended in the axial direction so as to secure as broad a surface area as possible for generating the eddy current, so that the rotational energy with respect to the torque of the rotor can be relatively low. Moreover, since the yoke is rotatably mounted on the yoke supporting stand, the iron loss can be remarkably reduced in comparison with the case, wherein the fixed type of yoke is used, even when the motor is operated at a high frequency by the use of the inverter. Accordingly, a low inertia, speed variable induction motor of good efficiency and having excellent response such as steep rising and trailing performance can be provided in accordance with the present invention.

So far, the present invention has been described with particular reference to two preferred embodiments of the low inertia, speed variable induction motor. It should, however, be noted that these embodiments are merely illustrative and no restrictive, and that various changes and modifications may be made by those persons skilled in the art within the spirit and scope of the present invention as recited in the appended claims.

I claim:

1. A low inertia, variable speed induction motor comprising:
   (a) a frame comprising a cylindrical outer wall, a circular end wall integral with said cylindrical outer wall, and a cylindrical inner wall integral with said circular end wall and extending from said circular end wall parallel to said cylindrical outer wall and in the same direction as said cylindrical outer wall;
   (b) an end bracket made of a non-magnetic material attached to said cylindrical outer wall and, with said circular end wall and said cylindrical outer wall, defining a cylindrical inner working volume;
   (c) an output shaft rotatably mounted in said cylindrical inner wall and said end bracket, said output shaft having a central axis which is also the central axis of said cylindrical outer wall and said cylindrical inner wall;
   (d) a stator fixedly mounted on the radially outer surface of said cylindrical inner wall;
   (e) a yoke rotatably mounted on the radially inner surface of said cylindrical outer wall, said yoke being disposed adjacent to said stator with a small cylindrical gap therebetween;
   (f) a cup-shaped rotor made of a non-magnetic and highly electrically conductive material fixedly mounted on said output shaft, said cup-shaped rotor comprising a circular bottom extending perpendicularly from said output shaft and a cylindrical working portion projecting into the gap between said stator and said yoke toward said circular end wall;

(g) a plurality of passages formed between said cylindrical outer wall and said yoke for the passage of cooling air;

(h) a plurality of suction ports in said circular end wall for the introduction of cooling air into said cylindrical inner working volume;

(i) a cooling fan mounted on each axial side of said yoke in position to draw cooling air into said cylindrical inner working volume through said plurality of suction ports in said circular end wall and through said plurality of passages formed between said cylindrical outer wall and said yoke;

(j) a plurality of discharge ports in said end bracket for the discharging of cooling air from said cylindrical inner working volume;

(k) a plurality of suction ports in said end bracket radially inwardly of said plurality of discharge ports in said end bracket for the introduction of cooling air into said cylindrical inner working volume;

(l) a plurality of cooling fan blades mounted on said circular bottom of said cup-shaped rotor in position to draw cooling air into said cylindrical inner working volume through said plurality of suction ports in said end bracket;

(m) a plurality of holes for the passage of cooling air in said circular bottom of said cup-shaped rotor radially inwardly of said plurality of cooling fan blades mounted on said circular bottom of said cup-shaped rotor;

(n) a plurality of passages formed between said cylindrical inner wall and said stator for the passage of cooling air in position to pass cooling air from said plurality of suction ports in said circular end wall through said plurality of passages formed between said cylindrical inner wall and said stator, thence through said plurality of holes for the passage of cooling air in said circular bottom of said cup-shaped rotor, and thence through said plurality of discharge ports in said end bracket;

(o) a heat discharge fin mounted on said circular bottom of said cup-shaped rotor and extending radially outwardly into the flow of cooling air from said plurality of passages formed between said cylindrical outer wall and said yoke to said plurality of discharge ports in said end bracket;

(p) a cooling fan mounted on said output shaft externally of said cylindrical inner working volume in position to force cooling air through said plurality of suction ports in said circular end wall; and (q) an electromagnetic braking means actuation of which brakes said output shaft.

2. A low inertia, variable speed induction motor comprising:

(a) a frame comprising a cylindrical outer wall, a circular end wall integral with said cylindrical outer wall, and a cylindrical inner wall integral with said circular end wall and extending from said circular end wall parallel to said cylindrical outer wall and in the same direction as said cylindrical outer wall;

(b) an end bracket made of a non-magnetic material attached to said cylindrical outer wall and, with said circular end wall and said cylindrical outer wall, defining a cylindrical inner working volume;

(c) an output shaft rotatably mounted in said cylindrical inner wall and said end bracket, said output shaft having a central axis which is also the central axis of said cylindrical outer wall and said cylindrical inner wall;

(d) a stator fixedly mounted on the radially inner surface of said cylindrical outer wall;

(e) a yoke rotatably mounted on the radially outer surface of said cylindrical inner wall, said yoke being disposed adjacent to said stator with a small cylindrical gap therebetween;

(f) a cup-shaped rotor made of a non-magnetic and highly electrically conductive material fixedly mounted on said output shaft, said cup-shaped rotor comprising a circular bottom extending perpendicularly from said output shaft and a cylindrical working portion projecting into the gap between said stator and said yoke toward said circular end wall;

(g) a plurality of cooling passages formed between said cylindrical outer wall and said rotor for the passage of cooling air;

(h) a plurality of suction ports in said circular end wall for the introduction of cooling air into said cylindrical inner working volume;

(i) a cooling fan mounted on the axial side of said yoke adjacent said circular end wall and positioned to draw cooling air into said cylindrical inner working volume through said plurality of suction ports in said circular end wall and through said plurality of passages formed between said cylindrical outer wall and said rotor;

(j) a plurality of discharge ports in said end bracket for the discharging of cooling air from said cylindrical inner working volume;

(k) a plurality of suction ports in said end bracket radially inwardly of said plurality of discharge ports in said end bracket for the introduction of cooling air into said cylindrical inner working volume;

(l) a plurality of cooling fan blades mounted on said circular bottom said said cup-shaped rotor in position to draw cooling air into said cylindrical inner working volume through said plurality of suction ports in said end bracket;

(m) a plurality of holes for the passage of cooling air in said circular bottom of said cup-shaped rotor radially inwardly of said plurality of cooling fan blades mounted on said circular bottom of said cup-shaped rotor;

(n) said cylindrical working portion of said cup-shaped rotor being spaced from said yoke to define a cooling air passage which permits passage of cooling air from said plurality of suction ports in said circular end wall through said cooling air passage, thence through said plurality of holes for the passage of cooling air in said circular bottom of said cup-shaped rotor, and thence through said plurality of discharge holes in said end bracket;

(o) a heat discharge fin mounted on said circular bottom of said cup-shaped rotor and extending radially outwardly into the flow of cooling air from said plurality of passages formed between said cylindrical outer wall and said rotor to said plurality of discharge ports in said end bracket;

(p) a cooling fan mounted on said output shaft externally of said cylindrical inner working volume in position to force cooling air through said plurality of suction ports in said circular end wall; and (q) an electromagnetic braking means actuation of which brakes said output shaft.

* * * * *